United States Patent [19]

Kress et al.

[11] Patent Number: 4,740,554

[45] Date of Patent: Apr. 26, 1988

[54] THERMOPLASTIC MOULDING COMPOSITIONS BASED ON POLYPHENYLENE OXIDE/POLYCARBONATE BLOCK CONDENSATES

[75] Inventors: Hans-Jürgen Kress; Peter Tacke; Dieter Freitag, all of Krefeld; Karl-Heinz Ott, Leverkusen, all of Fed. Rep. of Germany

[73] Assignee: Bayer Aktiengesellschaft, Leverkusen, Fed. Rep. of Germany

[21] Appl. No.: 929,187

[22] Filed: Nov. 10, 1986

[30] Foreign Application Priority Data

Nov. 23, 1985 [DE] Fed. Rep. of Germany ....... 3541406

[51] Int. Cl.$^4$ .............................................. C08L 69/00
[52] U.S. Cl. ........................................ 525/67; 525/68; 525/92; 525/147; 525/902; 525/905
[58] Field of Search .................. 525/67, 92, 391, 902, 525/905, 68, 147

[56] References Cited

U.S. PATENT DOCUMENTS 4,205,140 5/1980 Liebig et al. .......................... 525/67
4,446,278 5/1984 Loucks ................................. 525/92

Primary Examiner—Theodore E. Pertilla
Attorney, Agent, or Firm—Connolly & Hutz

[57] ABSTRACT

The present invention provides moulding compositions consisting of polyphenylene oxide/polycarbonate block condensates, graft polymers and, where appropriate, co-polymers. These moulding compositions can contain further suitable additives. The present invention also provides a process for preparing the moulding compositions according to the invention.

9 Claims, No Drawings

THERMOPLASTIC MOULDING COMPOSITIONS BASED ON POLYPHENYLENE OXIDE/POLYCARBONATE BLOCK CONDENSATES

The present invention provides thermoplastic moulding compositions consisting of A. 20 to 95 parts by weight, preferably 40 to 85 parts by weight, relative to 100 parts by weight of components A+B+C, of a thermoplastic polyphenylene oxide/polycarbonate block condensate A, B. 5 to 50 parts by weight, relative to 100 parts by weight of components A+B+C, of one or more graft polymers of B.1 5 to 90 parts by weight, preferably 30 to 80 parts by weight, of a mixture of B.1.1 50 to 100% by weight of styrene, α-methylstyrene, ring-substituted styrene, methyl methacrylate or mixtures thereof, and B.1.2 50 to 0% by weight (meth)acrylonitrile, methyl methacrylate, maleic anhydride, N-substituted maleimide or mixtures thereof, on B.2 95 to 10 parts by weight, preferably 70 to 20 parts by weight, of a rubber having a glass transition temperature $T_g \leq 10°$ C., and, where appropriate, C. 0 to 50 parts by weight, relative to 100 parts by weight of components A+B+C, of a thermoplastic copolymer of C.1 50 to 100% by weight of styrene, α-methylstyrene, ring-substituted styrene, methyl methacrylate or mixtures thereof, and C.2 50 to 0% by weight of (meth)acrylonitrile, methyl methacrylate, maleic anhydride, N-substituted maleimide or mixtures thereof, and/or, where appropriate, stabilizers, pigments, flow control agents, mould release agents, flame-proofing agents and/or antistats, which are characterized in that the polyphenylene oxide/polycarbonate block condensates A contain 5 to 40% by weight, preferably 10 to 30% by weight, relative to the total weight of block condensate A, of monofunctional structural units of the formula (I. 1.2),

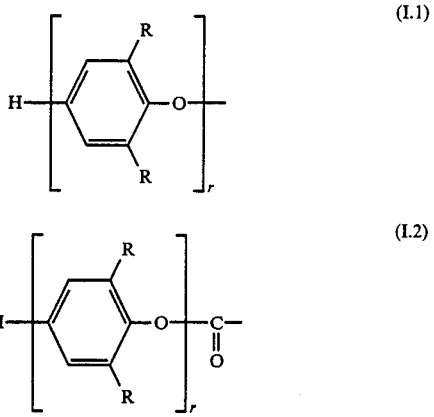

wherein

R is identical or different and stands for hydrogen or an alkyl radical of 1 to 4 C atoms, and "r" stands for a whole number from 1 to 200, and 95% by weight to 60% by weight, preferably 90% by weight to 70% by weight, relative to the total weight of block condensate A, of structural units of the formula (II)

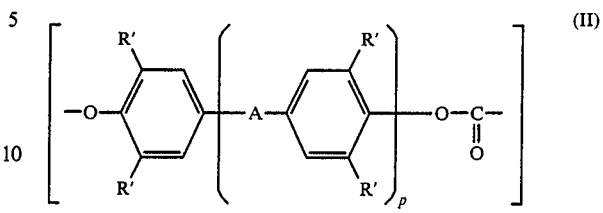

wherein A is a single bond, $C_1$-$C_6$-alkylene, $C_2$-$C_6$-alkylidene, $C_5$-$C_6$-cycloalkylidene,

—$SO_2$— or a radical of the formula (a)

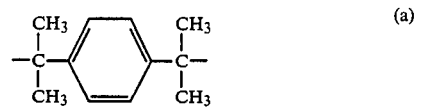

wherein

R' is identical or different and is H, Cl or Br and p is zero or 1.

A particularly preferred radical R is $CH_3$.

Component A can also be a mixture of polyphenylene oxide/polycarbonate block condensate with customary thermoplastic polycarbonates which are free of polyphenylene oxide, the total content of monofunctional structural units of the formula (I. 1.2) in this mixture being again between 5% by weight and 40% by weight, preferably between 10% by weight and 30% by weight, relative to the total weight of component A from polyphenylene oxide/polycarbonate block condensate and thermoplastic polycarbonates free of polyphenylene oxide.

U.S. Pat. No. 4,446,278 discloses block copolymers of polyphenylene oxide and sterically hindered aromatic polycarbonates and their blends with vinyl-aromatic resins, such as, for example, polystyrene of modified impact resistance. These products are distinguished by stability to thermal and oxidative influences. However, as listed in U.S. Pat. No. 4,446,278, Table VII, such products have only an inadequate resistance. By contrast, the moulding compositions according to the invention possess high notched impact resistance and, compared with pure polycarbonate/ABS mixtures, a distinctly improved heat distortion resistance.

COMPONENT A

The preparation of polycarbonate/polyphenylene oxide block condensates A having structural units of the formula (I. 1.2) can be effected by the phase boundary process in the known way from corresponding polyphenylene oxides (I a)

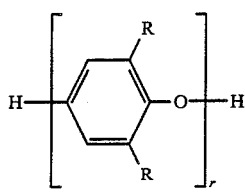

(Ia)

wherein R and r have the meaning mentioned for the formula (I), with the other diphenols (IIa)

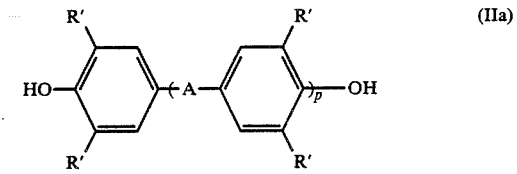

(IIa)

wherein A, R' and p have the meaning mentioned for the formula (II), phosgene, and where appropriate, branching agents. (See for example DE-OS (German Published Specification No.) 3,211,636).

The monofunctional polyphenylene oxides (I a) are described in the literature or preparable by processes described in the literature (see for example DE-OS (German Published Specification No.) 3,211,636, DE-OS (German Published Specification) No. 2,126,434, U.S. Pat. No. 3,306,875 and U.S. Pat. No. 4,028,341). For instance, monofunctional polyphenylene oxides of the formula (I a) can be prepared by oxidizing corresponding phenols (I b)

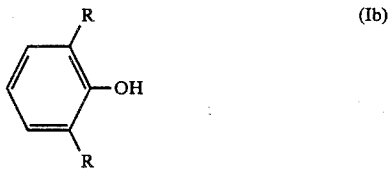

(Ib)

with oxygen (air) in the presence of catalyst combinations of copper salts and tertiary amines.

The organic phase of the phase boundary process consists for example in the known way of $CH_2Cl_2$, chlorobenzene or mixtures thereof.

The alkaline aqueous phase has in general a pH value of 8 to 14, preferably of 9 to 13.

The volume ratio of organic to inorganic phase is in general 1:6 to 1:1.

The amount of organic phase is in general apportioned in such a way that the resulting block polyether-polycarbonate is obtained as an 0.5 to 20 percent by weight solution.

The molar amount of phosgene is up to 150 mol-%, relative to the total number of moles of the diphenol components used.

Suitable catalysts for the phase boundary process are tertiary amines and/or quaternary ammonium salts and-/or quaternary phosphonium salts in amounts of 0.01 to 5 mol-%, relative to the total number of moles of diphenol components used.

Preferred catalysts are triethylamine, tetrabutylammonium bromide and N-ethylpiperidine.

Polycarbonate/polyphenylene oxide block condensates A having structural units of the formula (I.1.2) generally have relative solution viscosities of 0.8 to 2, in particular of 1.2 to 1.5, measured as a solution of 0.5 g of substance in 100 ml of $CH_2Cl_2$.

The processing of these block condensates having structural units (I.1.2) can be effected on commercially available machines by injection moulding or extrusion.

The monofunctional polyphenylene oxides of the formula (Ia) to be used have average number molecular weights $\overline{M}n$ of 500 to 10,000, preferably of 800 to 3,000, where $\overline{M}n$ can be measured by the osmometric method in $CH_2Cl_2$ as solvent.

The diphenols of the formula (IIa) are either described in the literature or preparable by processes described in the literature.

Suitable diphenols of the formula (IIa) are for example hydroquinone, resorcinol, 4,4'-dihydroxydiphenyl, 2,2-bis-(4-hydroxyphenyl)-propane, 2,4-bis-(4-hydroxyphenyl)-2-methylbutane, 1,1-bis-(4-hydroxyphenyl)-cyclohexane, 2,2-bis-(3-chloro-4-hydroxyphenyl)-propane, 2,2-bis-(3,5-dichloro-4-hydroxyphenyl)-propane and 2,2-bis-(3,5-dibromo-4-hydroxyphenyl)-propane.

Preferred diphenols of the formula (IIa) are 2,2-bis-(4-hydroxyphenyl)-propane, 2,2-bis-(3,5-dichloro-4-hydroxyphenyl)-propane, 2,2-bis-(3,5-dibromo-4-hydroxyphenyl)-propane and 1,1-bis-(4-hydroxyphenyl)-cyclohexane.

Suitable branching agents for preparing the block condensates having structural units of the formula (I.1,2) are those having three or more than three functional groups; suitable functional groups being preferably aromatic carbonyl chloride or phenolic OH groups.

Examples of branching agents are trimesyl trichloride, cyanuric trichloride, 3,3',4,4'-benzophenonetetracarbonyl tetrachloride, 1,4,5,8-naphthalenetetracarbonyl tetrachloride, pyromellitoyl tetrachloride, 1,3,5-tri-(4-hydroxyphenyl)-benzene, 1,1,1-tri-(4-hydroxyphenyl)ethane, tri-(4-hydroxyphenyl)-phenylmethane, 2,2-bis-[4,4-bis-(4-hydroxyphenyl)-cyclohexyl]-propane, 2,4-bis-(4-hydroxyphenyl-isopropyl)-phenol, tetra-(4-hydroxyphenyl)-methane, 2,6-bis-(2-hydroxy-5-methylbenzyl)-4-methylphenol, 2-(4-hydroxyphenyl)-2-(2,4-dihydroxyphenyl)-propane, tetra-(4-[4-hydroxyphenyl-isopropyl]phenoxy)-methane and 1,4-bis-[(4,4''-dihydroxytriphenyl)methyl]-benzene.

The incorporation of branching agents in polycarbonates, even in segmented polyether-polycarbonates, by the phase boundary process is known (see in this context DE-OS (German Published Specification) No. 1,570,533, U.S. Pat. No. 27,682, DE-OS (German Published Specification) No. 2,636,784 and DE-OS (German Published Specification) No. 2,726,376.

In place of the diphenols of the formula (IIa) it is also possible to use bischlorocarbonic acid esters of oligocarbonates of the diphenols of the formula (IIa), where "oligo" is to be understood here as meaning a degree of polymerization of 2 to 10.

COMPONENT B

Rubbers which are suitable for preparing the graft polymers for use as component B are in particular polybutadiene, butadiene/styrene copolymers with up to 30% by weight, relative to the weight of the rubber, of a lower alkyl ester of acrylic or methacrylic acid (for example methyl methacrylate, ethyl acrylate, methyl acrylate or ethyl methacrylate). Further suitable rubbers are for example polyisoprene or polychloroprene. Also suitable are alkyl acrylate rubbers based on $C_1$–$C_8$-alkyl acrylate, in particular ethyl acrylate, butyl acrylate, ethylhexyl acrylate. These alkyl acrylate rubbers can, where appropriate, contain up to 30% by weight, relative to the weight of the rubber, of monomers such as vinyl acetate, acrylonitrile, styrene, methyl methacrylate and/or vinyl ether as copolymerized units. These alkyl acrylate rubbers can further contain minor amounts, preferably up to 5% by weight, relative to the weight of the rubber, of ethylenically unsaturated monomers with a crosslinking action. Such crosslinkers are for example alkylene diol di(meth)-acrylates, polyester di-(meth)-acrylates, divinylbenzene, tri-vinylbenzene, triallyl cyanurate, allyl (meth)acrylate, butadiene or isoprene. Such alkyl acrylates are known. Acrylate rubbers for use as grafting substrates can also be products which contain a crosslinked diene rubber of one or more conjugated dienes, such as polybutadiene, or a copolymer of a conjugated diene with an ethylenically unsaturated monomer, such as styrene and/or acrylonitrile, as a core. Other suitable rubbers are for example EPDM rubbers, i.e. rubbers from ethylene, propylene and an unconjugated diene monomer.

Preferred rubbers for preparing the graft polymers B are diene monomer and alkyl acrylate rubbers.

The rubbers are present in the graft polymers B in the form of at least partially crosslinked particles of an average particle size of 0.09 to 5 $\mu$m, in particular 0.1 to 1 $\mu$m. The graft polymers B are prepared by free radical graft copolymerization of the above-defined monomer mixtures from B.1.1 and B.1.2 in the presence of the rubbers B.2 to be grafted, and are all known. Preferred processes for preparing the graft polymers B are emulsion, solution, mass or suspension polymerization. Particularly preferred graft polymers B are the so-called ABS polymers. Ring-substituted styrenes which may be mentioned are halogenostyrene and p-methylstyrene.

COMPONENT C

Preferred copolymers for use as component C are those from at least one monomer from the series styrene, $\alpha$-methylstyrene, halogenostyrene as per C.1 with, where appropriate, a monomer from the series acrylonitrile, methacrylonitrile, methyl methacrylate, maleic anhydride as per C.2.

Copolymers for use as component C are frequently formed as by-products in the graft polymerization for preparing component B, in particular when large amounts of monomers are grafted onto small amounts of rubber.

The amount of copolymer C to be used according to the invention, namely 0 to 50 parts by weight, relative to 100 parts by weight of A+B+C, does not include these by-products from the graft polymerization.

The copolymers for use as component C are resinous, thermoplastic and rubber-free. Particularly preferred copolymers C are those of styrene with acrylonitrile and, where appropriate, with methyl methacrylate, of $\alpha$-methylstyrene with acrylonitrile and, where appropriate, with methyl methacrylate or of styrene and $\alpha$-methylstyrene with acrylonitrile and, where appropriate, with methyl methacrylate, and those only of styrene.

Particularly preferred weight ratios in the thermoplastic copolymer C are 60 to 80% by weight of C.1 and 40 to 20% by weight of C.2, or 100% by weight of C.1.

The copolymers for use as component C are known and can be prepared by free radical polymerization, in particular by emulsion, suspension, solution or mass polymerization. The copolymers for use as component C preferably have molecular weights Mw (weight average, determined by light scattering or sedimentation) between 15,000 and 200,000.

The moulding compositions according to the invention can further contain additives which are suitable for polyethers, for polycarbonates or for ABS polymers, such as stabilizers, pigments, flow control agents, mould release agents, flameproofing agents and/or antistats.

Preferred stabilizers are for example substituted benzophenones or benzotriazoles or phosphites as described in European Offenlegungsschrift No. 0,023,291 or phenolic antioxidants.

Preferred mould release agents are for example esters of monohydric long-chain saturated alcohols and long-chain saturated fatty acids or of polyhydric saturated alcohols with long-chain fatty acids, for example pentaerythritol tetrastearate, trimethylolpropane tristearate, glycerol tristearate and stearyl stearate.

Suitable flameproofing agents are for example polyhalogenodiphenyl, polyhalogenodiphenyl ether, polyhalogenophthalic acid and their derivatives and polyhalogenooligocarbonates and polyhalogenopolycarbonates, the corresponding bromine compounds being particularly effective. In addition they contain as a rule a synergist, for example antimony trioxide.

Preferred flameproofing agents are phosphorus-containing organic compounds such as triphenyl phosphate, diphenyl cresyl phosphate, tris-(2,3-dibromopropyl)phosphate, diphenyl methanephosphonate and diphenyl phenylphosphonate, while agents which suppress dripping, such as polytetrafluoroethylene, can be used in addition and where, if appropriate, in addition organic bromine compounds can be combined, be it via bromine substitution in components A, B and/or C by addition of the above-mentioned bromine-containing flameproofing agents.

Particularly preferred flameproofing agents are triphenyl phosphate, phenyl cresyl phosphate and diphenyl methanephosphonate, where appropriate in combination with polytetrafluoroethylene.

The present invention thus also provides thermoplastic moulding compositions containing components A, B and, where appropriate, C, which are characterized in that they contain flameproofing agents based on phosphorus-containing organic compounds, where appropriate in combination with polytetrafluoroethylenes and, where appropriate, organic bromine compounds.

The moulding compositions according to the invention and consisting of components A, B and, where appropriate, C and/or, where appropriate, further known additives such as stabilizers, pigments, flow control agents, mould release agents, flameproofing agents and/or antistatics are prepared by mixing the particular constituents in the known way and melt-compounding or melt-extruding the mixture at temperatures as 200° C. to 330° C. in customary machines such as internal kneaders, extruders or twin shaft screws.

The present invention thus also provides a process for preparing thermoplastic moulding compositions consisting of components A, B and, where appropriate, component C, stabilizers, pigments, flow control agents, mould release agents, flameproofing agents and/or antistatics, which is characterized in that components A, B and, where appropriate, component C, stabilizers, pigments, flow control agents, mould release agents, flameproofing agents and/or antistatics are gradually or simultaneously mixed in the known way and the mixture is then melt-compounded or melt-extruded at temperatures of 200° C. to 330° C. in customary machines.

The present invention also provides a process for preparing thermoplastic moulding compositions containing components A, B, where appropriate C and flameproofing agents, which is characterized in that the individual constituents are gradually or simultaneously mixed in the known way and the mixture is then melt-compounded or melt-extruded at temperatures of 200° C. to 330° C. in customary machines, and in that the flameproofing agents used are those based on phosphorus-containing organic compounds, where appropriate in combination with polytetrafluoroethylenes and, where appropriate, organic bromine compounds.

The mixing of the individual constituents can be effected in the known way not only at about 20° C. (room temperature) but also at elevated temperature.

The moulding compositions of the present invention can be used for preparing mouldings of any kind. In particular it is possible to prepare mouldings by injection moulding. Examples of preparable mouldings are: housing parts of any kind (for example for domestic appliances such as juice extractors, coffee machines, blenders) or cover sheets for the building sector and parts for the automotive sector. They are also used in the field of electrical engineering, since they have very good electrical properties.

A further form of processing is the preparation of mouldings by deep-drawing from prefabricated sheets or films.

Particle size always denotes average particle diameter $d_{50}$, determined by ultracentrifuge measurements by the method of W. Scholtan et al., Kolloid-Z. and Z. Polymere 250 (1972) pages 782–796.

EXAMPLES

Preparation of the polyphenylene oxide/polycarbonate block copolymers according to the invention I. Preparation of a monofunctional polyphenylene oxide component 30 g of CuCl and 30 g of 4-dimethylaminopyridine are dispersed or dissolved in 1 l of chlorobenzene. Air (100 l/h) is then passed through the solution for 30 min. A solution of 1 kg of 2,6-dimethylphenol in 9 l of chlorobenzene is then added while air is still being passed in. In the course of the addition the reaction temperature rises from 20° C. to about 32° C. The reaction is discontinued when the OH content in the dissolved organic solid is 1.0% by weight (IR spectroscopic determination by calibration curve), which corresponds to an average molecular weight $\overline{M}_n$ of 1700.

II. Preparation of a polyphenylene oxide/polycarbonate block copolymer A 1)

1368 g (6 mol) of bisphenol A were dissolved with 1920 g (48 mol) of NaOH in 50 l of water. After addition of a solution of 340 g of the monofunctional polyphenylene oxide I in 12 l of chlorobenzene and 14 l of dichloromethane, 1.4 kg (14.14 mol) of phosgene are passed in at 22° C. at pH 13 to 14 with vigorous stirring in the course of 50 min. After addition of 36 ml of N-ethylpiperidine the subsequent reaction, still with vigorous stirring, required 1 hour at 20°–25° C. and pH 13. To work up, the phases were separated, the organic phase was acidified and washed until electrolyte-free, and the dichloromethane was distilled off. The evaporation of the chlorobenzene was effected in a twin shaft screw extruder at 310° C. in a vacuo. The relative solution viscosity measured in dichloromethane at 23° C. and a concentration of 0.5% was 1.280.

A.2

Polycarbonate of 2,2-bis-(4-hydroxyphenyl)-propane (bisphenol A) having a relative solution viscosity of 1.26 to 1.28, measured in methylene chloride at 23° C. and a concentration of 0.5% by weight.

B.

SAN graft polymer of 50% by weight of styrene-acrylonitrile mixture (in a weight ratio of 72:28) and 50% of particulate polybutadiene having an average particle size ($d_{50}$) of 0.4 μm, obtained by emulsion polymerization.

C.1

Styrene-acrylonitrile copolymer having a styrene-acrylonitrile ratio of 72:28 and a limiting viscosity $[\eta]=0.55$ dl/g (measurement in dimethylformamide at 20° C.).

C.2

Commercially available polystyrene from BASF with the designation Polystyrol 168N.

The table below gives the compositions and the test data obtained.

Preparation of the moulding compositions according to the invention.

The compounding of components A, B and C was effected on a 1.3-L internal kneader at a temperature of 200°–230° C.

The preparation of mouldings was effected on an injection moulding machine at 260° C.

The determination of the notched impact resistance was effected in line with DIN 53,453/ISO R 179 on bars measuring 50×6×4 mm, the bars having been provided with a V-shaped notch of 2.7 mm in depth.

The determination of the Vicat heat distortion resistance was effected in accordance with DIN 53,460.

| | A1 | A2 | B | C1 | C2 | Notched impact resistance kJ/m$^2$ | Heat distortion resistance °C. |
|---|---|---|---|---|---|---|---|
| | | | Parts by weight | | | | |
| Experiments according to the invention | 60 | | 24 | 16 | | 47.9 | 123 |
| | 60 | | 24 | | 16 | 55.8 | 132 |
| Comparative experiments | | 60 | 24 | 16 | | 35 | 121 |

We claim:

1. Thermoplastic moulding compositions consisting of
   A. 20 to 95 parts by weight, relative to 100 parts by weight of components A+B+C, of a thermoplastic polyphenylene oxide/polycarbonate block condensate A,
   B. 5 to 50 parts by weight, relative to 100 parts by weight of components A+B+C, of one or more graft polymers of
   B.1 5 to 90 parts by weight, of a mixture of
   B.1.1 50 to 100% by weight of styrene, α-methylstyrene, ring-substituted styrene, methyl methacrylate or mixtures thereof, and
   B.1.2 50 to 0% by weight (meth)acrylonitrile, methyl methacrylate, maleic anhydride, N-substituted maleimide or mixtures thereof, on
   B.2 95 to 10 parts by weight, of a rubber having a glass transition temperature $T_g \leq 10°$ C., and, C. 0 to 50 parts by weight, relative to 100 parts by weight of components A+B+C, of a thermoplastic copolymer of C.1 50 to 100% by weight of styrene, α-methylstyrene, ring-substituted styrene, methyl methacrylate or mixtures thereof, and C.2. 50 to 0% by weight of (meth)acrylonitrile, methyl methacrylate, maleic anhydride, N-substituted maleimide or mixtures thereof, characterized in that the polyphenylene oxide/polycarbonate block condensates A contain 5% by weight to 40% by weight, relative to the total weight of block condensate A, of monofunctional structural units of the formula (I.1), (I.2) or both,

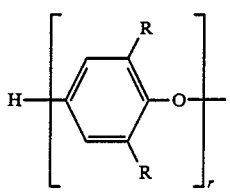

(I.1)

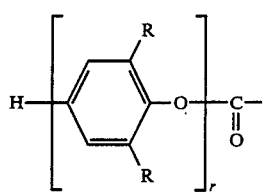

(I.2)

wherein
R is identical or different and stands for hydrogen or an alkyl radical of 1 to 4 C atoms, and
"r" stands for a whole number from 1 to 200, and 95% by weight to 60% by weight, relative to the total weight of the block condensate A, of structural units of the formula (II)

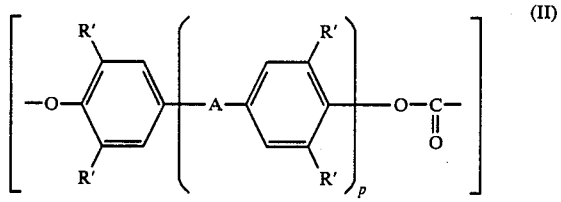

(II)

wherein A is a single bond, $C_1$–$C_6$-alkylene, $C_2$–$C_6$-alkylidene, $C_5$–$C_6$-cycloalkylidene,

—$SO_2$— or a radical of the formula (a)

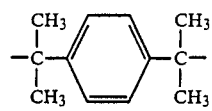

(a)

wherein
R' is H, and
p is zero or 1.

2. Moulding compositions according to claim 1, characterized in that R is $CH_3$.

3. Moulding compositions according to claim 1, characterized in that component A is a mixture of the polyphenylene oxide/polycarbonate block condensate of claim 1 with customary thermoplastic polycarbonates free of polyphenylene oxide, the total content of polyphenylene ether blocks in this mixture being between 5% by weight and 40% by weight, relative to the total weight of component A of polyphenylene oxide/polycarbonate block condensate and thermoplastic polycarbonates free of polyphenylene oxide.

4. Moulding compositions according to claim 1, characterized in that component A contains 10% by weight to 30% by weight of monofunctional structural units of the formula (I.1), (I.2) or both, and 90% by weight to 70% by weight of structural units of the formula (II).

5. Moulding compositions according to claim 1 characterized in that they additionally consist of at least one additive selected from the group consisting of stabilizers, pigments, flow control agents, mould release agents, flameproofing agents and antistats.

6. Thermoplastic moulding compositions containing
A. 20 to 95 parts by weight, relative to 100 parts by weight of components A+B+C, of component A according to claim 1,
B. 5 to 50 parts by weight, relative to 100 parts by weight of components A+B+C, of component B according to claim 1 and,
C. 0 to 50 parts by weight, relative to 100 parts by weight of components A+B+C, of component C according to claim 1, characterized in that they contain flameproofing agents based on phosphorus-containing organic compounds.

7. Process for preparing the moulding compositions according to claim 1, characterized in that components A, B and C are mixed in the known way and the mixture is then melt-compounded or melt-extruded at temperatures of 200° C. to 330° C. in customary machines.

8. Process according to claim 7, characterized in that at least one additive selected from the group consisting of stabilizers, pigments, flow control agents, mould release agents, flameproofing agents and antistats is included.

9. Process according to claim 7, characterized in that flameproofing agents based on phosphorus-containing organic compounds in conmbination with polytetrafluoroethylenes and, where appropriate, organic bromine compounds are included.

* * * * *